(12) United States Patent
Jordan

(10) Patent No.: US 9,522,831 B2
(45) Date of Patent: Dec. 20, 2016

(54) WATER CLOSET AND SEPTIC SYSTEM

(71) Applicant: Geoff Jordan, Oklahoma City, OK (US)

(72) Inventor: Geoff Jordan, Oklahoma City, OK (US)

(*) Notice: Subject to any disclaimer, the term of this patent is extended or adjusted under 35 U.S.C. 154(b) by 221 days.

(21) Appl. No.: 14/449,731

(22) Filed: Aug. 1, 2014

(65) Prior Publication Data

US 2016/0031734 A1 Feb. 4, 2016

(51) Int. Cl.
| | | |
|---|---|---|
| *C02F 3/28* | (2006.01) | |
| *E03F 11/00* | (2006.01) | |
| *E03D 11/11* | (2006.01) | |
| *A47K 11/02* | (2006.01) | |
| *A47K 17/02* | (2006.01) | |

(52) U.S. Cl.
CPC ............ *C02F 3/2866* (2013.01); *C02F 3/286* (2013.01); *E03F 11/00* (2013.01); *A47K 11/02* (2013.01); *A47K 17/028* (2013.01); *C02F 2203/006* (2013.01); *E03D 11/11* (2013.01)

(58) Field of Classification Search
CPC ..... C02F 3/28; C02F 3/2866; C02F 2203/006; C02F 3/286; E03D 11/11; E03D 11/13; E03F 11/00; A47K 11/02; A47K 17/028
USPC .... 210/170.08, 532.2, 538, 540, 610; 4/321, 4/420, 460, 476, 905
See application file for complete search history.

(56) References Cited

U.S. PATENT DOCUMENTS

| | | | | |
|---|---|---|---|---|
| 109,160 | A * | 11/1870 | Warren | B01D 17/0208 210/532.2 |
| 604,597 | A * | 5/1898 | Bliss | A47K 17/028 4/905 |
| 1,105,237 | A * | 7/1914 | Ashley | A47K 11/02 210/532.2 |
| 1,120,351 | A * | 12/1914 | Weston | B67D 1/0456 210/532.2 |
| 1,290,886 | A * | 1/1919 | Booker | A47K 11/02 210/532.2 |
| 1,719,419 | A | 7/1929 | Bennett | |
| 1,950,841 | A * | 3/1934 | Crawford | C02F 3/28 210/170.08 |
| 2,364,472 | A * | 12/1944 | Piatt | C02F 3/28 210/532.2 |
| 2,482,353 | A * | 9/1949 | Loelkes | C02F 3/28 210/532.2 |
| 2,795,542 | A * | 6/1957 | Horne | C02F 3/046 210/170.08 |

(Continued)

FOREIGN PATENT DOCUMENTS

WO WO 2013/100840 7/2013

*Primary Examiner* — Christopher Upton
(74) *Attorney, Agent, or Firm* — Dunlap Codding, P.C.

(57) ABSTRACT

A water closet for disposing of human waste includes a septic system, a toilet, a floor, and an enclosure. The septic system includes a primary chamber, a secondary chamber spaced a distance laterally from the primary chamber, a fluid communication member extending between the primary chamber and the secondary chamber, and an outlet member extending away from the secondary chamber. The septic system further includes an anaerobic bacterial treatment that processes excretory material disposed in the primary chamber into effluent which is transferred out of the primary chamber via the fluid communication member and into the secondary chamber before it is transferred out of the secondary chamber via an outlet member that extends towards either a leach field or a third chamber.

26 Claims, 7 Drawing Sheets

(56) References Cited

U.S. PATENT DOCUMENTS

| | | | | |
|---|---|---|---|---|
| 2,846,073 | A | * | 8/1958 | Hopper, Sr. ........ B01D 17/0208 |
| | | | | 210/540 |
| 3,269,940 | A | * | 8/1966 | Attaway ................... C02F 3/34 |
| | | | | 210/610 |
| 3,501,007 | A | * | 3/1970 | Davis ...................... C02F 3/046 |
| | | | | 210/532.2 |
| 3,856,682 | A | * | 12/1974 | Summers ........... B01D 17/0208 |
| | | | | 210/540 |
| 3,862,039 | A | * | 1/1975 | Summers ........... B01D 17/0208 |
| | | | | 210/540 |
| 4,001,108 | A | | 1/1977 | Hellqvist |
| 4,008,689 | A | * | 2/1977 | Albers ...................... C02F 3/28 |
| | | | | 119/450 |
| 4,298,470 | A | * | 11/1981 | Stallings ................. E03F 11/00 |
| | | | | 210/532.2 |
| 4,347,632 | A | | 9/1982 | Criss |
| 4,505,813 | A | * | 3/1985 | Graves ................. C02F 3/1242 |
| | | | | 210/532.2 |
| 4,627,116 | A | | 12/1986 | Shimizu |
| 5,104,542 | A | * | 4/1992 | Dixon .................... E03F 11/00 |
| | | | | 210/532.2 |
| 5,171,690 | A | | 12/1992 | Ylosjoki |
| 5,228,984 | A | | 7/1993 | Lindstrom |
| 5,256,378 | A | | 10/1993 | Elston |
| 5,285,534 | A | | 2/1994 | Criss |
| 6,374,430 | B1 | | 4/2002 | Ostbo |
| 6,601,243 | B2 | | 8/2003 | Colombot |
| 7,987,529 | B1 | * | 8/2011 | Wise ....................... E03D 11/04 |
| | | | | 4/905 |
| 2004/0040081 | A1 | | 3/2004 | Ostbo |
| 2012/0233758 | A1 | | 9/2012 | Tolles et al. |

* cited by examiner

WATER CLOSET AND SEPTIC SYSTEM

BACKGROUND

Disposal of human waste has been difficult in remote and rural areas. The practice of open defecation in many countries results in the contamination of surface waterways with fecal matter, parasites, and bacteria. Such contamination is responsible for the deaths of over two million people annually, mostly children less than five years of age.

Septic systems are well-known and have been used for a long time to dispose of human waste. Septic chambers used in septic systems employing water-flushing mechanisms are often located a substantial distance away from the toilet. However, the placement of a septic chamber a substantial distance away from the toilet may not be feasible in remote rural areas. For example, construction associated with water-flushing systems makes them environmentally and cost prohibitive in such areas.

Composting toilet systems are well-known and have been implemented as an alternative to water-flushing systems. Composting toilet systems include a single chamber that is positioned beneath the toilet. With less construction over a given geographical area, such composting toilet systems may be preferred over water-flushing systems for economic or environmental reasons.

Prior composting toilet systems include a single septic chamber. Those that include divisions within the single chamber do not include separate communicating chambers that are designed to handle overflow. Most of these singled chamber composting toilet systems are also horizontally oriented. Some of the prior composting toilet systems include the addition of bacteria that decompose human waste. Those that do prefer aerobic bacteria. Similarly, such composting toilet systems use water inherent in the system instead of adding water. Finally, the prior composting toilet systems lack liners for waterproofing the chamber walls.

BRIEF DESCRIPTION OF THE DRAWINGS

Certain embodiments of the inventive concepts will hereafter be described with reference to the accompanying drawings, wherein like reference numerals denote like elements. It should be understood, however, that the accompanying figures illustrate the various implementations described herein and are not meant to limit the scope of the various technologies described herein.

DETAILED DESCRIPTION

Specific embodiments of the inventive concepts disclosed herein will now be described in detail with reference to the accompanying drawings. Further, in the following detailed description of embodiments of the present disclosure, numerous specific details are set forth in order to provide a more thorough understanding of the disclosure. However, it will be apparent to one of ordinary skill in the art that the embodiments disclosed herein may be practiced without these specific details. In other instances, well-known features have not been described in detail to avoid unnecessarily complicating the description.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited or inherently present therein.

As used herein any references to "one embodiment," "an embodiment," or "some embodiments" means that a particular element, feature, structure, or characteristic described in connection with the embodiment is included in at least one embodiment. The appearances of the phrase "in one embodiment" in various places in the specification may not refer to the same embodiment.

Figure 1:
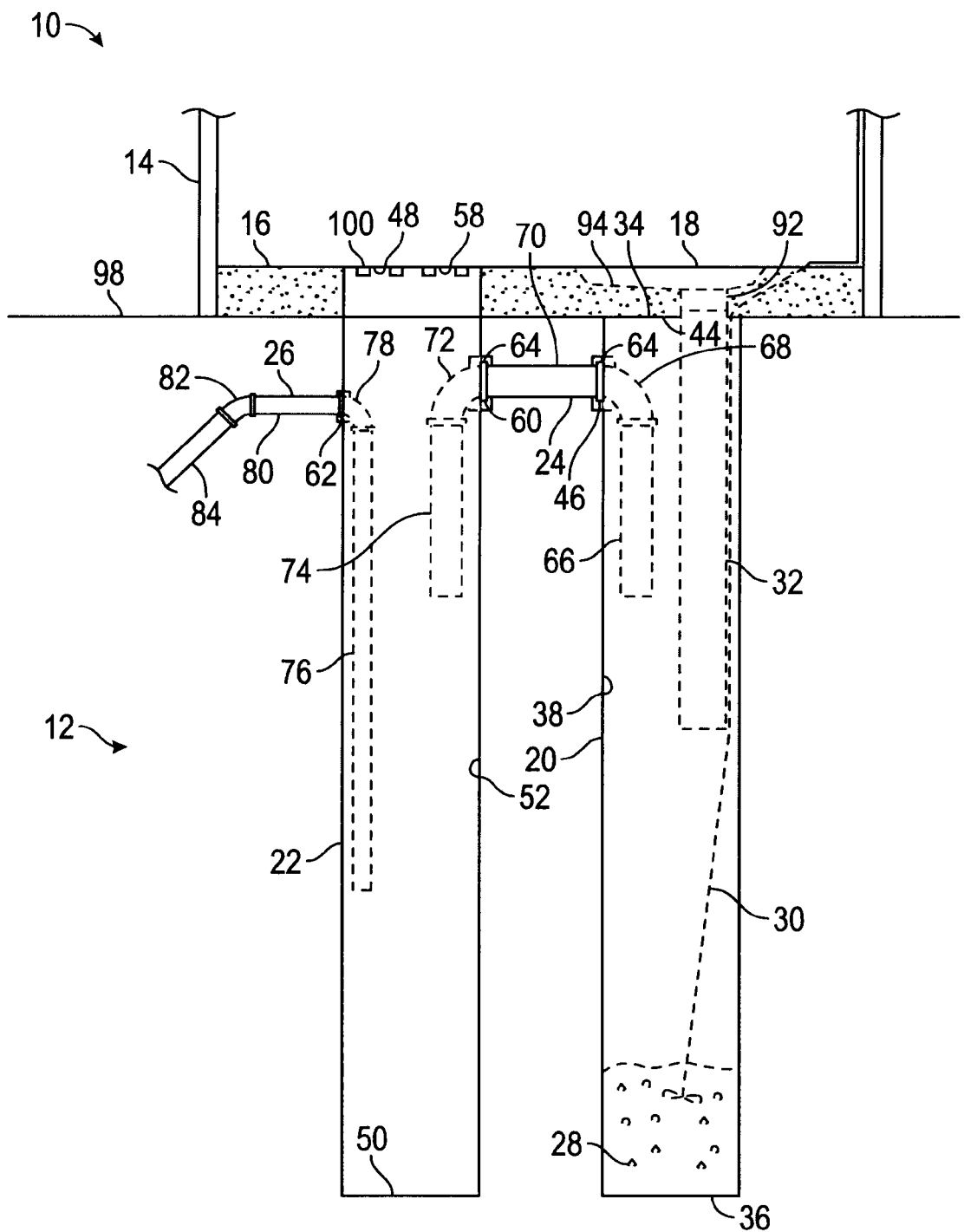
FIG. 1 a side elevational fragmental view of a water closet constructed in accordance with the inventive concepts disclosed herein.
Figure 2:
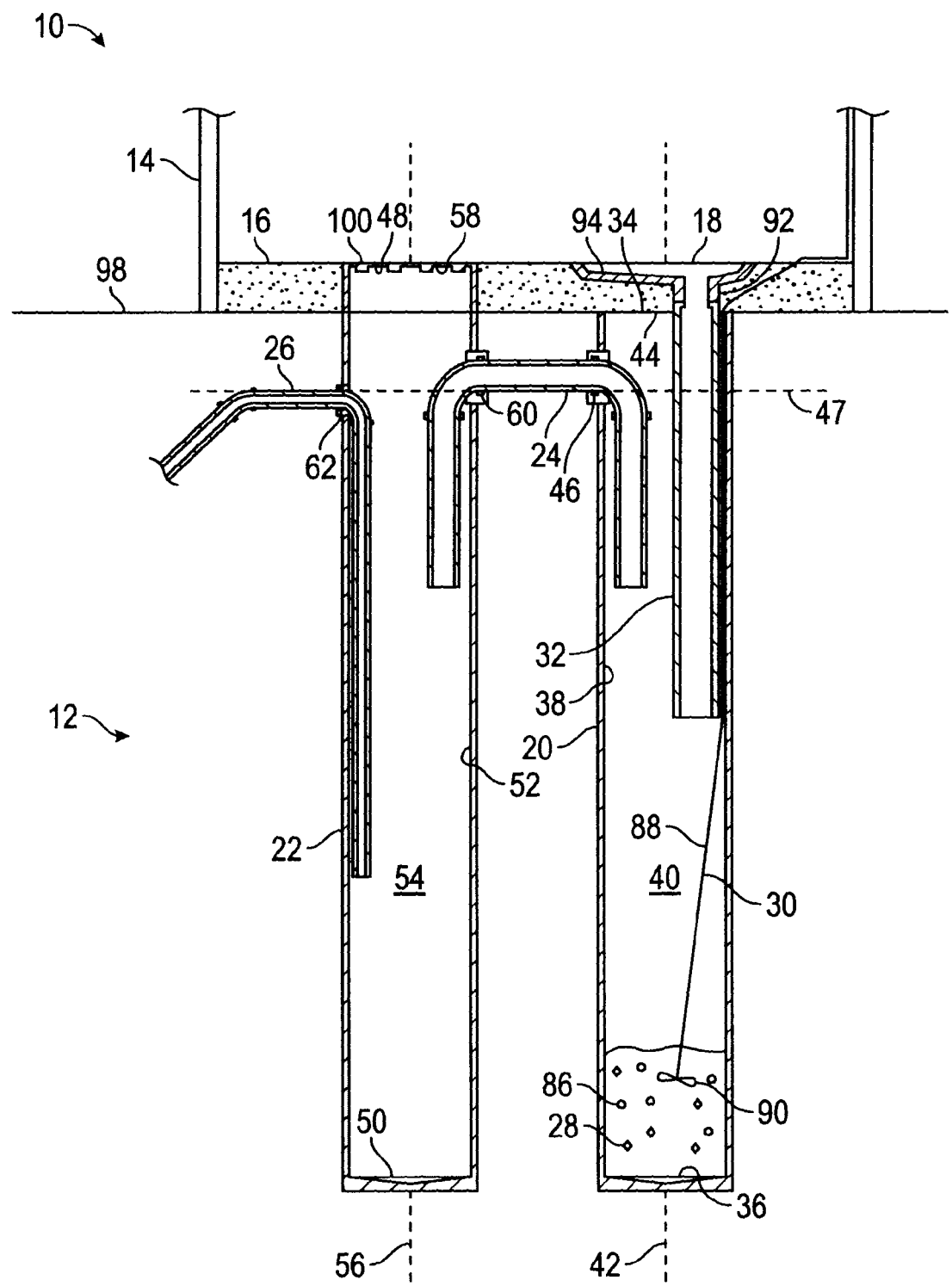
FIG. 2 is a cross sectional view of the water closet of FIG. 1 taken along the 2-2 line of FIG. 3.
Figure 3:
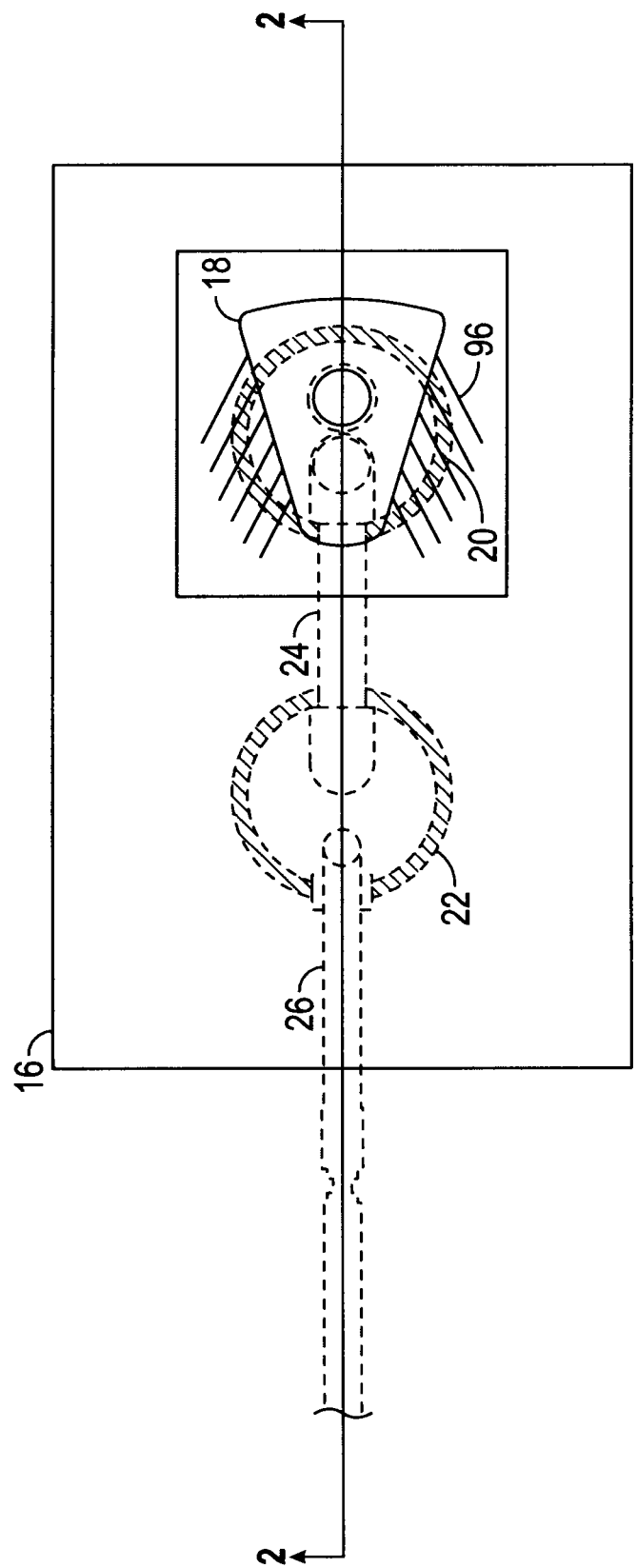
FIG. 3 is a top plan view of the water closet of FIG. 1

Referring now to FIGS. 1-3, shown therein is a water closet 10 and accompanying septic system 12 for use in disposing of human waste. The water closet 10 includes an enclosure 14, a floor 16, a toilet 18, and the septic system 12. The enclosure 14 provides privacy for an individual using the toilet 18 which is shown as being embedded in the floor 16, but it should be understood that the toilet 18 may be positioned above the floor 16. The septic system 12 is positioned below the floor 16.

The septic system 12 includes a primary chamber 20, a secondary chamber 22, a fluid communication member 24 extending between the primary chamber 20 and the secondary chamber 22, and an outlet member 26 extending outwardly from the secondary chamber 22. The septic system 12 may also include an anaerobic bacterial treatment 28, an agitation member 30, and a chute 32, described below. In some embodiments, the septic system 12 is configured to be either partially or completely above ground level. For example, in the completely above ground embodiments the septic system 12 may be positioned between the floor 16 and the earth. In the partially above ground embodiments, the septic system 12 may be positioned, for example, three feet above ground and three feet below ground. In either the partially or completely above ground embodiments, the floor 16 may be part of a raised platform. Positioning the septic system 12 completely or partially above ground level reduces adverse effects in areas prone to flooding. In other embodiments, septic system 12 is configured to be positioned below ground level (as shown in FIGS. 1-8). In some embodiments, the outlet member 26 may be connected to a waste disposal system, such as those described below. The primary chamber 20 may be directly below the toilet 18 and secondary chamber 22 may be offset laterally from the toilet 18.

The primary chamber 20 includes a top 34, a bottom wall 36, an at least one side wall 38 connected to and extending between the top 34 and the bottom wall 36 to at least partially surround a first cavity 40, and a first axis 42 extending between the top 34 and the bottom wall 36. The top 34 defines a first opening 44, and the side wall 38 defines a second opening 46 which is positioned between the top 34 and the bottom wall 36 of the primary chamber 20. In some embodiments, the second opening 46 is proximate to the top 34 of primary chamber 20 and distal in relation to the bottom wall 36. The second opening 46 is generally aligned with a fill line 47 of the septic system 12.

The primary chamber 20 may be formed of variety of shapes including but not limited to cylindrical, polygonal, or square. In at least one embodiment, the primary chamber 20 includes one side wall 38 that is shaped in a circle. In other embodiments, the primary chamber 20 may include four side walls forming the shape of a square. The primary chamber 20 may also be formed of a variety of sizes. For example, the cross section diameter of the primary chamber 20 may be but is not limited to being between six and twelve inches. Specifically, in at least one embodiment the cross section diameter is ten and a quarter inch. In other embodiments, in which the septic system 12 is below ground, the cross section diameter of the primary chamber 20 may conform to the length of the diameter created by a tool designed to bore holes in the ground, such as an auger or a post hole digger. The primary chamber 20 may also be formed of a variety of lengths. For example the length of the primary chamber 20 may be but is not limited to being between five and ten feet. Specifically in at least one embodiment, the length of the primary chamber 20 is seven feet. The primary chamber 20 may be formed of a fluid impermeable material, such as a suitable resinous, or a rigid or semi-rigid plastic, such as polyvinyl chloride (PVC) by extrusion, injection, other known processes, or may be formed of other suitable materials such as stainless or galvanized steel by extrusion, piercing, welding or other known processes. In some embodiments, the sidewall 38 of the primary chamber 20 may be formed of a rigid or semirigid plastic tube, and the bottom wall 36 may be formed of an end cap that is connected to the plastic tube. The primary chamber 20 may also be formed of a woven textile or plastic bag.

The secondary chamber 22 is spaced a distance laterally from the primary chamber 20 and includes a top 48, a bottom wall 50, at least one side wall 52 connected to and extending between the top 48 and the bottom wall 50 to at least partially surround a second cavity 54, and a second axis 56 extending between the top 48 and the bottom wall 50. The top 48 defines a first opening 58, and the side wall 52 defines a second opening 60 and a third opening 62. The second opening 60 and the third opening 62 are positioned between the top 48 and the bottom wall 50, and the third opening 62 is spaced a distance apart vertically from the second opening 60. In some embodiments, the second opening 60 and the third opening 62 are proximate to the top 48 of the secondary chamber 22 and distal in relation to the bottom wall 50 of the secondary chamber 22. The first axis 42 of the primary chamber 20 is substantially parallel to the second axis 56 of the secondary chamber 22. The secondary chamber 22 may be formed of the same shapes, sizes, and materials as those of the primary chamber 20. A lower portion of the second opening 60 and an upper portion of the third opening 62 may be aligned with the fill line 47.

The fluid communication member 24 extends between the second opening 46 of the primary chamber 20 and the second opening 60 of the secondary chamber 22. The fluid communication member 24 is configured to allow an effluent to transfer from first cavity 40 of the primary chamber 20 to the second cavity 54 of the secondary chamber 22. In one embodiment, the fluid communication member 24 includes a first pipe 66 connected to a first pipe elbow 68 connected to a second pipe 70 connected to a second pipe elbow 72 connected to a third pipe 74 to form a U-shaped structure. The first pipe 66 is positioned in the first cavity 40 of the primary chamber 20 where the first pipe 66 is connected to the first elbow 68 positioned near the second opening 46 of the primary chamber 20. The first pipe elbow 68 connects to the second pipe 70 at the second opening 46 of the primary chamber 20. The second pipe 70 extends between the second opening 46 of the primary chamber 20 and the second opening 60 of the secondary chamber 22 and connects to the second pipe elbow 72 at the second opening 60 of the secondary chamber 22. The second pipe elbow 72 is positioned in the second cavity 54 of the secondary chamber 22 and connected to the third pipe 74 near the second opening 60 of the secondary chamber 22. In order to prevent effluent from leaking from the fluid communication member 24 into or out of the primary chamber 20 and the secondary chamber 22, respectively, sealants 64 may be provided at the second opening 46 of the primary chamber 20 and the second opening 60 of the secondary chamber 22.

The first, second, and third pipes 66, 70, and 74 and the first and second pipe elbows 68 and 72 of the fluid communication member 24 may be formed of a variety of sizes. For example, the cross section diameters of each may be but are not limited to being between one and five inches. Specifically, in at least one embodiment the cross section diameters of each pipe and pipe elbows are three inches. In at least one embodiment the first and second elbows 68 and 72 include a ninety degree angle. It should be appreciated that one or more T-joints may be used as an alternative to or in combination with the pipe elbows to provide access to the communication member 24 for cleanouts. The fluid communication member 24 may be formed of a resinous, or a rigid or semi-rigid plastic, such as polyvinyl chloride (PVC) by extrusion, injection, other known processes, or may be formed of other suitable materials such as stainless or galvanized steel by extrusion, piercing, welding or other known processes. The sealants 64 provided at the second opening 46 of the primary chamber 20 may be formed of a suitable resinous material such as pipe dope or other known piping sealants. The sealants 64 may also be formed by other materials such as an O-ring, a coupling, or other known devices that connect and seal component parts of a plumbing type of system.

The outlet member 26 extends outwardly from the third opening 62 of the secondary chamber 22. The outlet member 26 is configured to allow an effluent to transfer out of the second cavity 54 of the secondary chamber 22 when the effluent has reached a predetermined level, e.g., the fill line 47, within the second cavity 54 of the secondary chamber 22. In one embodiment, the outlet member 26 includes a first pipe 76 connected to a first pipe elbow 78 connected to a second pipe 80 connected to a second pipe elbow 82 connected to a third pipe 84. In order to prevent effluent from leaking from the outlet member 26 into and out of the second cavity 54 of the secondary chamber 22, sealants 64 may be provided at third opening 62 of the secondary chamber 22.

The first, second, and third pipes 76, 80, and 84 and the first and second pipe elbows 78 and 82 of the outlet member 26 may be formed of a variety of sizes. For example, the cross section diameters of each may be but are not limited to being between one and four inches. Specifically, in at least one embodiment the cross section diameters of each are two inches, and in at least one embodiment the first pipe elbow 78 includes a right angle and the second pipe elbow 82 include a forty-five degree angle. It should be appreciated that one or more T-joints may be used as an alternative to or in combination with the pipe elbows to provide access to the outlet member 26 for cleanouts. The fluid communication member 24 may be formed of a resinous, or a rigid or semi-rigid plastic, such as polyvinyl chloride (PVC) by extrusion, injection, other known processes, or may be formed of other suitable materials such as stainless or galvanized steel by extrusion, piercing, welding or other known processes. The sealants 64 provided at the second opening 46 of the primary chamber 20 may be formed of a suitable resinous material such as pipe dope or other known piping sealants. The sealants 64 may also be formed by other materials such as an 0-ring, a coupling, or other known devices that connect and seal component parts of a plumbing type of system.

The septic system 12 may include an anaerobic bacterial treatment 28 disposed within the first cavity 40 of the primary chamber 20 and the second cavity 54 of the secondary chamber 22. The anaerobic bacterial treatment 28 interacts with an excretory material 86 in the primary chamber 20 to transform the excretory material 86 into an effluent. The anaerobic bacterial treatment 28 may consist of naturally occurring materials such as the combination of vegetation based activated carbon like material, a stabilized naturally occurring anaerobic and facultative blend, and fat eating lipase enzyme derived from natural sources, cultured, and stored on dextrose sugar. The interaction between the anaerobic bacterial treatment 28 and the excretory material 86 may result in reduced sludge formation and elimination of odors. The anaerobic bacterial treatment 28 may also enhance vegetation growth in leach fields, described below.

For example, the general situation in village Africa where people are subsistence farming and make a poor living, is that fertilizers are expensive and the people suffer poor crop yields because of the lack of fertilizers. However, their sanitation practice is to defecate on the ground near and around the village, which washes into and contaminates waterways and essential nutrients which could be used in farming, are lost.

The water closet 10 described herein retains the nutrients from people (or animals) defecating by using a composting process with anaerobic bacteria to convert the nitrogen from ammonia to organic nitrogen, which plants may uptake readily. Similarly, phosphorus is released during the composting process from phosphate to elemental phosphorus which again aids plant growth. By directing the effluent from the septic system 12 through a leach field underneath a crop, the septic system 12 directs nutrient rich effluent to the crop which can increase crop yields.

The septic system 12 may further include an agitation member 30 disposed within the first cavity 40 of the primary chamber 20 and supported so as to be movable. The agitation member 30 may extend through the first opening 44 of the top 34 of the primary chamber 20 towards the bottom wall 36 of the primary chamber 20. The agitation member 30 is configured to increase contact between the anaerobic bacterial treatment 28 and the excretory material 86. The agitation member 30 may include a shaft and a blade, such as shaft 88 and blade 90. The blade 90 may turn about the shaft 88 to agitate the anaerobic bacterial treatment 28 and the excretory material 86. Alternatively, the agitation member may include a shaft or a cable that terminates in a block, or flap which moves up and down when triggered by a power source. The agitation member 30 may be formed of suitable rigid or semi rigid plastic or a galvanized metal and may be powered by wind, the sun, mechanical means (such as movement of a door of the enclosure 14), or a battery.

Tests have been performed to evaluate the efficacy of providing an anaerobic bacterial treatment, such as anaerobic treatment 28, and an agitation member, such as agitation member 30. The test involved three septic systems having primary chambers (constructed similar to primary chamber 20). Each primary chamber was provided with hog feces and urine (equivalent to fifteen adults) daily for sixth months. The hogs ate a diet equivalent to an African village diet—namely, soy proteins and ground corn carbohydrates. The first test chamber was not provided with either an aerobic bacterial treatment or an agitation member. The second test chamber was provided with an anaerobic bacterial treatment, but not an agitation member. The third test chamber was provided with an anaerobic bacterial treatment and an agitation member. The third chamber was also agitated thirty seconds per day for the sixth month test period. After the sixth month period, the second chamber showed reduced sludge as compared to the first chamber, and the third chamber showed the greatest reduction in sludge. Thus, it was concluded that the anaerobic bacterial treatment reduced the amount of sludge, and the use of the agitation member further reduced the amount of sludge.

The septic system 12 may further include the chute 32 positioned within the first cavity 40 of the primary chamber 20. The chute 32 extends from proximate to the top 34 and towards the bottom wall 36 of the primary chamber 20. The chute 12 is configured to direct the excretory material 86 downwardly in the primary chamber 20. The chute 32 may be formed of a variety of sizes. For example, the cross section diameter may be but is not limited to being between three and six inches. Specifically, in at least one embodiment the cross section diameter of the chute 32 is four inches. The chute 32 may formed of a suitable resinous, or a rigid or semi-rigid plastic, such as polyvinyl chloride (PVC) by extrusion, injection, other known processes, or may be formed of other suitable materials such as stainless or galvanized steel by extrusion, piercing, welding or other known processes.

The water closet 10 may include the toilet 18 positioned over the top 34 of the primary chamber 20 of the septic system 12. The toilet 18 has an outlet 92 in communication with the first opening 44 of the primary chamber 20 to direct excretory material downwardly into the first cavity 40 of the primary chamber 20. The toilet 18 may have a basin 94 and one or more traction members 96 extending outwardly from the basin 94. An individual using the toilet 18 may place their feet on the traction members 96 and squat over the toilet 18 in order to dispose of excretory material into the toilet 18. In one embodiment (as shown in FIGS. 1-2), the outlet 92 of the toilet 18 is connected to the chute 32 of the septic system 12 to direct excretory material even further downwardly into the first cavity 40 of the primary chamber 20. Any floor-mounted squatting pan or other type of toilet known in the art that may or may not use running water may be used as the toilet 18. The toilet 18 may be formed of a variety of sizes. For example, the external dimensions of the toilet 18 may be between but not limiting to fifteen to thirty inches by ten to sixteen inches by six to nine inches. In one embodiment, the toilet 18 is twenty inches long and sixteen and a half inches wide with a seven and half inch basin. The toilet 18 may be formed of a plastic material such as polyestrene, polypropylene, polyvinyl chloride, fiber glass or any plastic vacuum formed, or it may be formed of a clay material such as porcelain or ceramic, or any other known suitable material.

The toilet 18 may be recessed in the floor 16 of the water closet 10 or may be positioned above the floor 16 in the water closet 10. In one embodiment (as shown in FIGS. 1-2), the toilet 18 is recessed in the floor 16 which is positioned on a ground level 98 above the septic system 12. The floor 16 defines the first opening 44 above the top 34 of the primary chamber 20 and the first opening 58 above the top 48 of secondary chamber 22. The first opening 44 is sized and dimensioned to allow the chute 32 to communicate with the outlet 92 of the toilet 18 near the top 34 of the primary chamber 20. The floor 16 may be formed of concrete (such as a mixture including cement, sand, and gravel and water), wood, or beaten sheet metal.

The floor 16 may include an access lid 100 positioned above and in communication with the first opening 58 of the secondary chamber 22. The access lid 100 is provided so that the secondary chamber 22 can be accessed for maintenance or removal of the septic system 12. The access lid 100 may be formed of a variety of sizes and shapes to cover and/or the disposed and supported within the first opening 58 of the secondary chamber 22. The access lid 100 may be formed of a variety of materials including but not limited to stainless steel, precast concrete, plastic, or any other suitable material known in the art.

To install the water closet 10 and the septic system 12, an installer digs a first hole and a second hole with a digging tool, such as an auger. The typical auger digs a hole twelve to eighteen inches in diameter but no more than three feet in diameter. The first and second holes may be twelve inches in diameter, six and one half feet in depth, and spaced twelve inches apart. The installer then removes the dirt between the two holes near the surface of the Earth by digging a first trench between the two holes using a trenching tool such as a trencher. This can also be accomplished in other ways, such as by using a shovel. The first trench is made to accommodate the fluid communication member 24. The first trench may be four inches wide and fifteen inches deep. Next, the installer digs a second trench that extends away from the second hole to accommodate the outlet member and any additional piping associated with disposal of the effluent. The second trench may be six inches wide and eighteen inches deep. Once the dirt is removed, the components of the septic system 12 are applied, including but not limited to the primary chamber 20, the secondary chamber 22, the fluid communication member 24 extending between the primary chamber 20 and the secondary chamber 22, and the outlet member 26 extending from the secondary chamber 22. The outlet member 26 can be connected to a waste disposal system such as a leach field by way of suitable piping, for example to dispose of the effluent. The holes and trenches may be back filled to cover the septic system 12. Next, an amount of water may be placed into the first cavity 40 of the primary chamber 20 up to the predetermined fill line 47 and the anaerobic bacterial treatment 28 may be placed in the first cavity 40 of the primary chamber 20. The installer then applies the chute 32 and the toilet 18 followed by the application of the floor 16 by, for example, pouring a slab of concrete. Once the floor 16 has been applied, the enclosure 14 can be built or otherwise erected around the floor 16.

Figure 4:
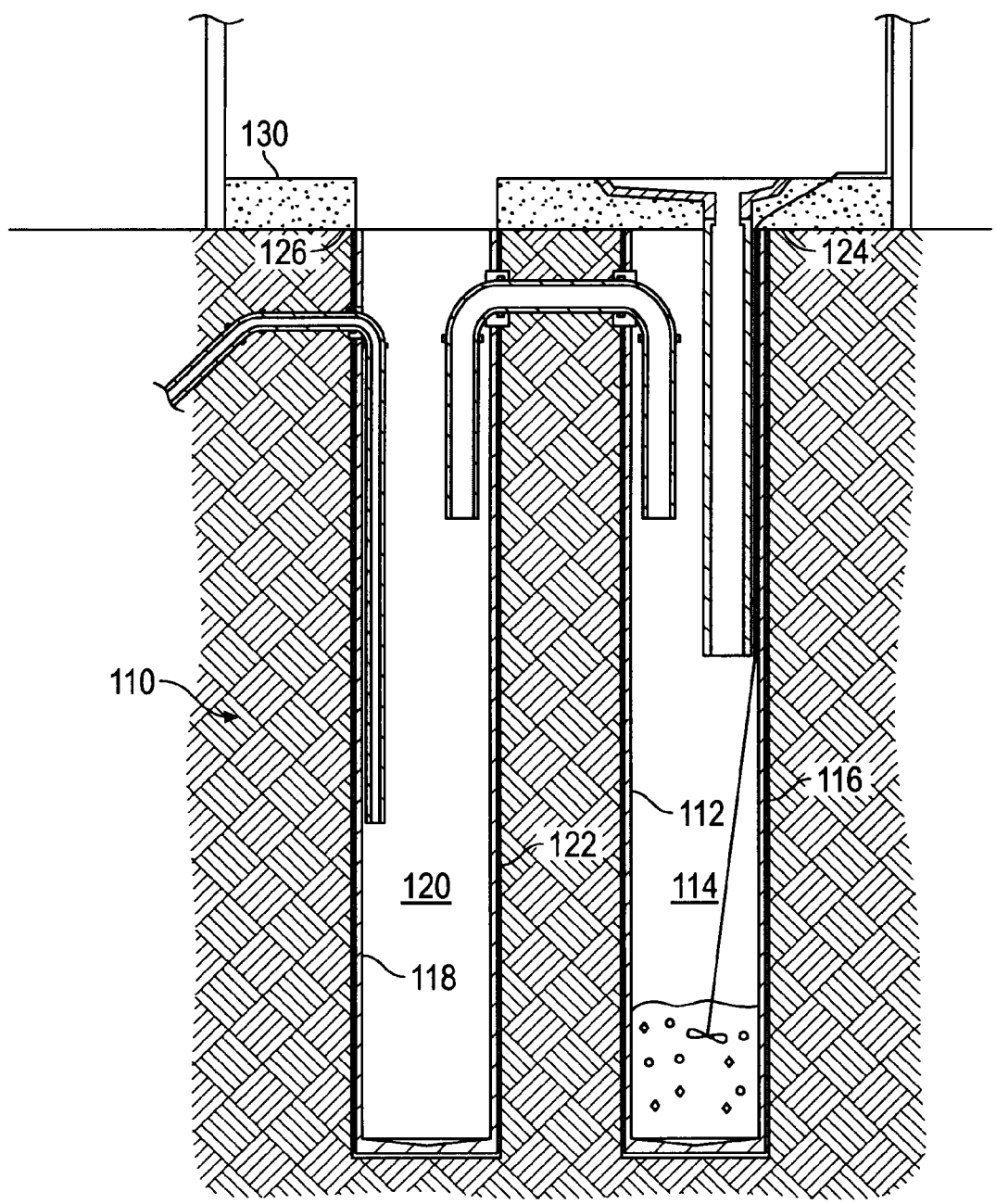
FIG. 4 is a cross sectional view of another embodiment of a water closet constructed in accordance with the inventive concepts disclosed herein in taken along lines 5-5 depicted in FIG. 6.

Now referring to FIG. 4, another embodiment of a septic system (namely septic system 110) constructed in accordance with the inventive concepts is described herein. Septic system 110 may be constructed similar to septic system 12 except that septic system 110 further includes a first liner 112 positioned within a first cavity 114 of a primary chamber 116 and a second liner 118 positioned within a second cavity 120 of a secondary chamber 122. The first liner 112 and the second liner 118 each have a pair of handles 124 and 126, respectively, for accessing and removing the first and second liners 112 and 118 if necessary. The pair of handles 124 extend from the primary chamber 114 at a top thereof, and the pair of handles 126 extend from the secondary chamber 122 at the top thereof. A floor 130 may be positioned over the pair of handles 124 and 126 to hold the first liner 112 and the second liner 118 in position and to seal the first liner 112 and the second liner 118 so that liquid is transferred into and retained within the first and second cavities 114 and 120, respectively. The first liner 112 is sized to correspond to the first cavity 114, and the second liner 118 is sized to correspond to the second cavity 120. The first liner 112 and the second liner 114 may be formed of a variety of materials so long as they are constructed of at least one fluid-impermeable material. All other components of septic system 110 may be constructed according to the components in septic system 12.

Figure 5:
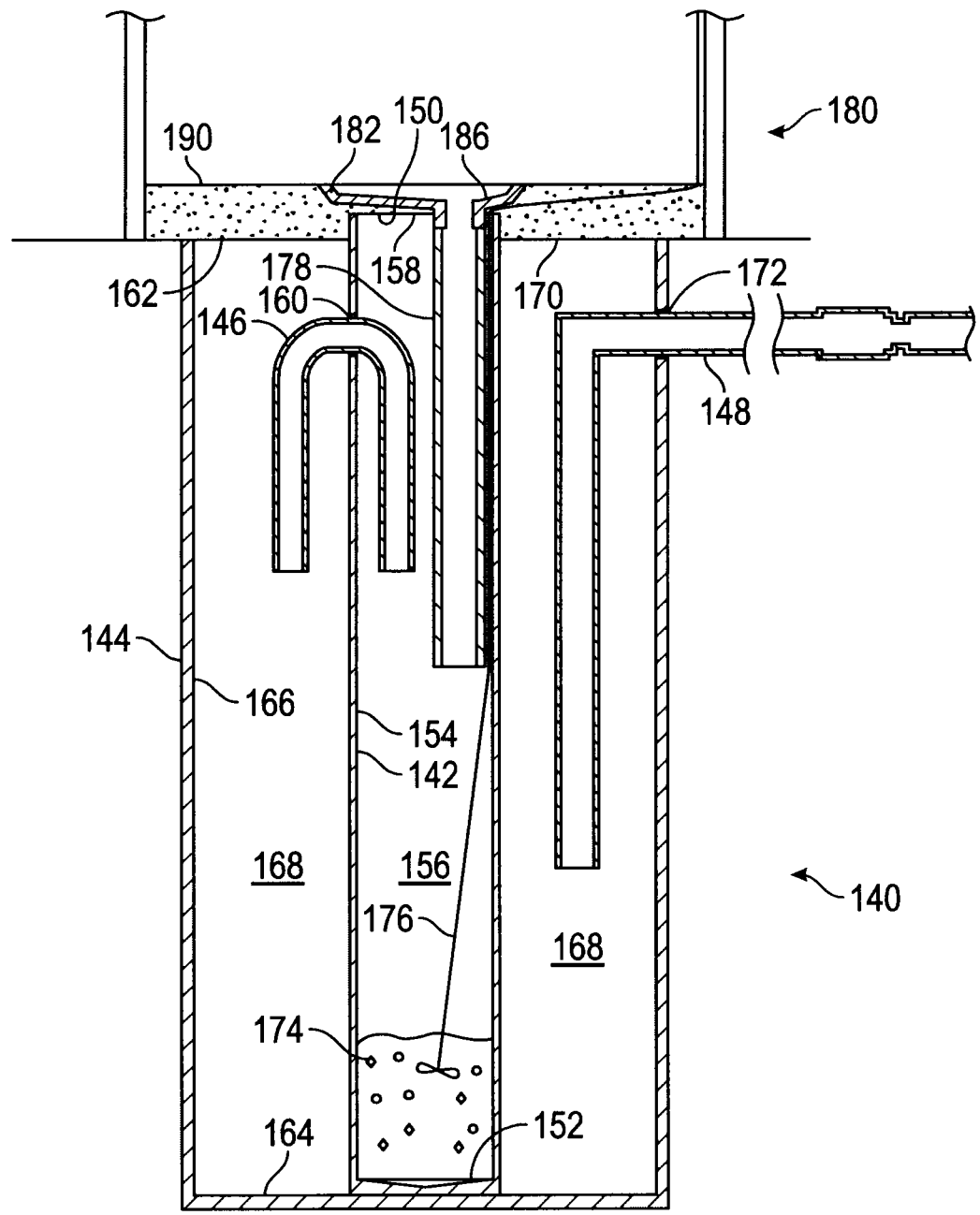
FIG. 5 is a cross sectional view of another embodiment of a water closet constructed in accordance with the inventive concepts disclosed herein.
Figure 6:
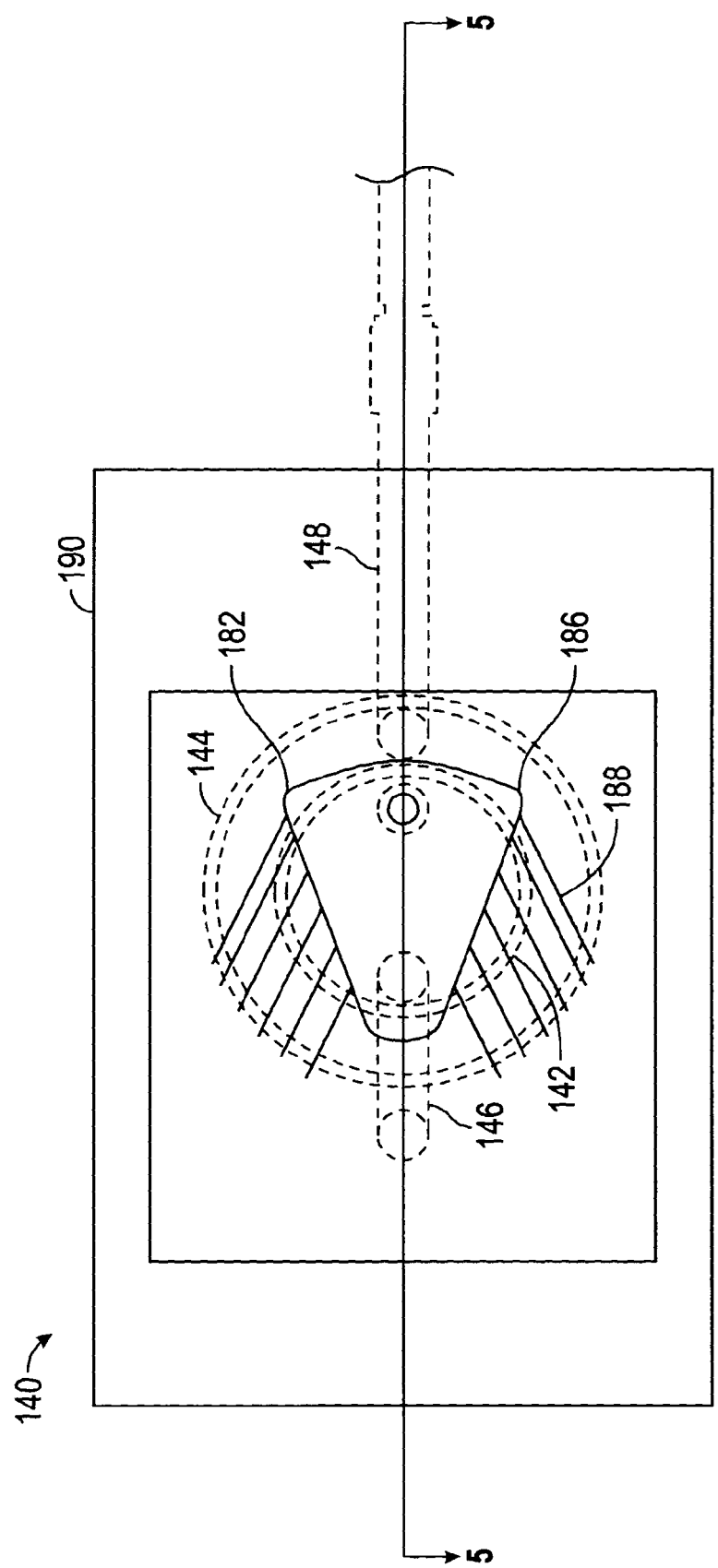
FIG. 6 is a top plan view of the water closet of FIG. 5.

Referring now to FIGS. 5-6, another embodiment of a septic system (namely septic system 140) constructed in accordance with the inventive concepts is described herein. Septic system 140 includes a primary chamber 142, a secondary chamber 144, a fluid communication member 146 extending between the primary chamber 142 and the secondary chamber 144, and an outlet member 148 extending outwardly form the secondary chamber 144. The septic system 144 may also include an anaerobic bacterial treatment, an agitation member, and a chute, as described below. In some embodiments, the septic system 140 is configured to be below a ground level, and in some embodiments, the outlet member 148 may be connected to a waste disposal system, such as those described below.

The primary chamber 142 includes a top 150, a bottom wall 152, at least one side wall 154 connected to and extending between the top 150 and the bottom wall 153 to at least partially surround a first cavity 156. The top 150 defines a first opening 158, and the side wall 154 defines a second opening 160 which is positioned between the top 150 and the bottom wall 152. In some embodiments, the second opening 160 is proximate to the top 150 and distal in relation to the bottom wall 152. The primary chamber 142 may be formed of a variety of shapes, sizes and materials, including those similar to shapes, sizes, and materials of primary chamber 20, described above.

The secondary chamber 144 surrounds and encompasses at least a portion of the sidewall 154 of the primary chamber 142 and includes a top 162, a bottom wall 164, at least one side wall 166 connected to and extending between the top 162 and the bottom wall 154 to at least partially surround a second cavity 168. The top 162 defines a first opening 170, and the side wall 166 defines a second opening 172. The second opening 172 is positioned between the top 162 and the bottom wall 164. In some embodiments, the second opening 172 is proximate to the top 162 of secondary chamber 144 and distal in relation to the bottom wall 154 of the secondary chamber 144. The secondary chamber 144 may be formed of the same shapes, sizes, and materials as those of the primary chamber 20 so long as the secondary chamber 144 is larger than the primary chamber 142.

The fluid communication member 146 extends from the first cavity 156 through the second opening 160 of the primary chamber 142 and into the second cavity 168 of the secondary chamber 144. The fluid communication member 106 is configured to allow an effluent to transfer from the primary chamber 142 to the secondary chamber 144. The fluid communication member 146 is configured to allow an effluent to transfer from first cavity 156 of the primary chamber 142 to the second cavity 168 of the secondary chamber 144 when the effluent has reached a predetermined level within the first cavity 156 of the primary chamber 142. The fluid communication member 146 may be formed of a variety of sizes and materials, including those similar to the sizes and materials of fluid communication member 24, described above.

The outlet member 148 extends outwardly from the second opening 172 of the secondary chamber 144. The outlet member 148 is configured to allow an effluent to transfer out of the second cavity 168 of the secondary chamber 144 when the effluent has reached a predetermined level within the second cavity 168 of the secondary chamber 144. The outlet member 148 may be formed of a variety of sizes and materials, including those similar to the sizes and materials of outlet member 26, described above.

As in septic systems 12 and 110, the septic system 140 may include an anaerobic bacterial treatment (such as an aerobic bacterial treatment 174) disposed within the first cavity 156 of the primary chamber 142. The anaerobic bacterial treatment 174 interacts with an excretory material in the first cavity 156 of the primary chamber 142 to transform the excretory material into the effluent. The anaerobic bacterially treatment 174 may consist of the same materials as anaerobic bacterially treatment 28, described above.

The septic system 140 may further include an agitation member (such as agitation member 176) disposed within the first cavity 156 of the primary chamber 142 and supported so as to be movable. The agitation member 176 may extend through first opening 158 of the top 150 towards the bottom wall 152 of the primary chamber 20. The agitation member 176 is configured to increase contact between the anaerobic bacterial treatment 174 and excretory material and may be formed of the same shapes and materials as agitation member 30, described above.

The septic system 140 may further include a chute 178 positioned within the first cavity 156 of the primary chamber 142. The chute 178 extends from proximate to the top 150 and towards the bottom wall 152 of the primary chamber 142. The chute 178 is configured to direct excretory material downwardly in the primary chamber 142.

The septic system 140 may be a part of a water closet (such as water closet 180) constructed similarly to water closet 10. The water closet 180 may include a toilet 182 positioned over the top 150 of the primary chamber 142 of the septic system 140. The toilet 182 has an outlet 184 in communication with the first opening 158 of the primary chamber 142 to direct excretory material downwardly into the first cavity 156 of the primary chamber 142. The toilet 182 may have a basin 186 and one or more traction members 188 extending outwardly from the basin 186. In one embodiment, the toilet 182 is connected to the chute 178 of the septic system 140 to direct excretory material even further downwardly into the first cavity 156 of the primary chamber 142. The toilet 182 may be constructed of the same size and materials as toilet 18 described above and may be recessed in a floor (such as floor 190) surrounded by an enclosure (such as enclosure 192) constructed similar to floor 16 and enclosure 14 described above.

Figure 7:
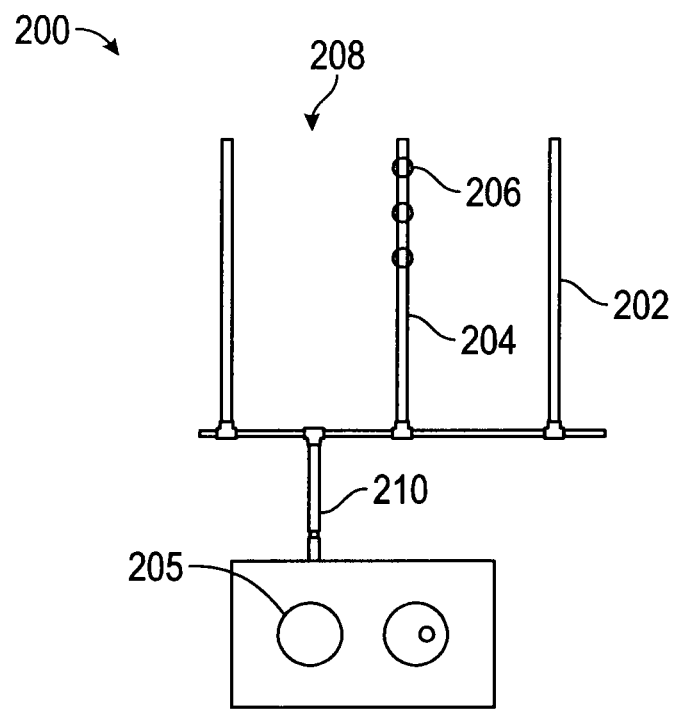
FIG. 7 is a top plan view of a waste disposal system constructed in accordance with the inventive concepts disclosed herein.

Referring now to FIG. 7 shown and described herein is a waste disposal system 200. The waste disposal system 200 includes a septic system (such as septic system 202 constructed according to septic systems 12, 110, or 140) which further includes a tubular member 202 spaced a distance apart from a secondary chamber (such as secondary chamber 205, constructed according to secondary chambers 22, 122, or 144). The tubular member 202 includes a plurality of perforations 206 through which effluent is transferred into a leach field 208. An outlet member (such as outlet member 210 constructed similar to outlet member 26 or 148) extends away from a secondary chamber 205 and towards the tubular member 204. In once embodiment, the waste disposal system includes a plurality of tubular members connected to an outlet member via a T-piece.

Figure 8:
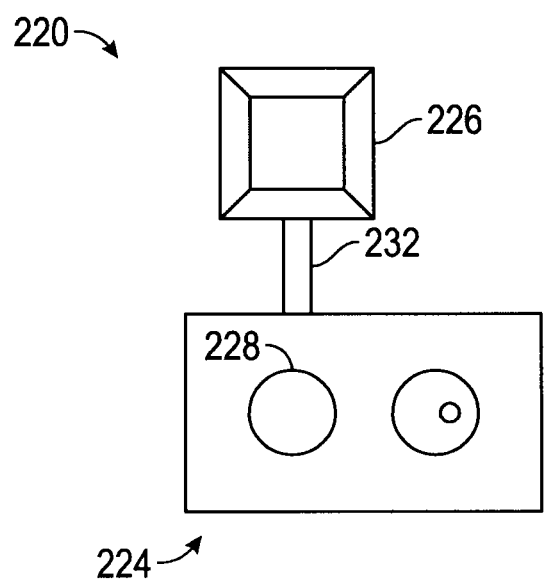
FIG. 8 is a top plan view of another embodiment of a waste disposal system constructed in accordance with the inventive concepts disclosed herein.

Referring now to FIG. 8 shown and described herein is another embodiment of a waste disposal system 220. The waste disposal system 220 includes a septic system (such as septic system 224 constructed according to septic systems 12, 110, or 140) which further includes a third chamber 226 spaced a distance apart from a secondary chamber (such as secondary chamber 228, constructed according to secondary chambers 22, 122, or 144). The third chamber 226 includes a top, a bottom wall, and at least one side wall. An outlet member (such as outlet member 232 constructed similar to outlet member 26 or 148) extends away from the secondary chamber 228 and towards the third chamber 226.

It should be understood that waste disposal systems 200 and 220 may be implemented in combination with any of the septic systems 12, 110, or 140 described above.

Although the preceding description has been described herein with reference to particular means, materials and embodiments, it is not intended to be limited to the particulars disclosed herein; rather, it extends to functionally equivalent structures, methods, and uses, such as are within the scope of the appended claims.

What is claimed is:

1. A water closet, comprising:
a septic system comprising:
a primary chamber having a top, a bottom wall, and at least one side wall connected to and extending between the top and the bottom wall to at least partially surround a first cavity, the primary chamber having a depth and a width and a first axis extending between the top and the bottom wall, the top defining a first opening and the at least one side wall defining a second opening positioned between the top and the bottom wall, the primary chamber constructed of at least one fluid-impermeable material, wherein the depth of the primary chamber is within a range from 5 to 20 times the width;
a secondary chamber, spaced a distance laterally from the primary chamber, the secondary chamber having a top, a bottom wall, and at least one side wall connected to and extending between the top and the bottom wall to at least partially surround a second cavity, and a second axis extending between the top and the bottom wall, the top defining a first opening and the at least one side wall defining a second opening and a third opening, the second opening and the third opening positioned between the top and the bottom wall, with the third opening spaced a distance vertically from the second opening, the first and second axes being substantially parallel, the secondary chamber constructed of at least one fluid-impermeable material;

a fluid communication member extending between the second opening of the primary chamber and the second opening of the secondary chamber, the fluid communication member configured to allow an effluent to transfer from the first cavity of the primary chamber to the second cavity of the secondary chamber;

an outlet member extending outwardly from the third opening of the secondary chamber, the outlet member configured to allow the effluent to transfer out of the second cavity of the secondary chamber when the effluent has reached a predetermined level within the secondary chamber; and a toilet positioned over the top of the primary chamber of the septic system and having an outlet in communication with the first opening of the primary chamber to direct excretory material into the first cavity of the primary chamber.

2. The water closet of claim 1, further comprising an anaerobic bacterial treatment disposed within the first cavity of the primary chamber, the anaerobic bacterial treatment comprising an activated carbon material.

3. The water closet of claim 2, further comprising an agitation member disposed within the first cavity in close proximity to the bottom wall of the primary chamber and supported so as to be movable.

4. The water closet of claim 3, further comprising an enclosure having a door, wherein the agitation member is operated by the movement of the door.

5. The water closet of claim 1, wherein the septic system further comprises a chute connected to the toilet and positioned within the first cavity and extending from proximate to the top of the primary chamber and towards the bottom wall of the primary chamber, the chute configured to direct excretory material downwardly into the first cavity of the primary chamber.

6. The water closet of claim 1, wherein the toilet has a basin and one or more traction members extending outwardly from the basin.

7. The water closet of 1, further comprising a floor positioned above the primary chamber and the secondary chamber of the septic system, the floor defining the first opening at the top of the primary chamber and the first opening at the top of the secondary chamber.

8. The water closet of claim 7, further comprising an access lid positioned at the top of the secondary chamber of the septic system.

9. The septic system of claim 1, further comprising at least one tubular member spaced a distance apart from the secondary chamber, the tubular member having a plurality of perforations, wherein the outlet member extends away from the secondary chamber and towards the tubular member.

10. The septic system of claim 1, further comprising a third chamber spaced a distance apart from the secondary chamber, the third chamber having a top, a bottom, and at least one side wall, wherein the outlet member extends between the secondary chamber and the third chamber.

11. A water closet, comprising:
a septic system comprising:
a primary chamber having a top, a bottom wall, and at least one side wall connected to and extending between the top and the bottom wall to at least partially surround a first cavity, the top defining a first opening and the at least one side wall defining a second opening positioned between the top and the bottom wall, the primary chamber constructed of at least one fluid-impermeable material and having a depth and a width, wherein the depth of the cavity is within a range from 5 to 20 times the width;

a secondary chamber surrounding and encompassing at least a portion of the sidewall of the primary chamber, the secondary chamber having a top, a bottom wall, and at least one side wall connected to and extending between the top and the bottom wall to at least partially surround a second cavity positioned between the sidewall of the secondary chamber and the sidewall of the first chamber, the top of the secondary chamber defining a first opening and the at least one sidewall of the secondary chamber defining a second opening, the second opening and the third opening positioned between the top and the bottom wall, with the third opening spaced a distance vertically from the second opening, the secondary chamber constructed of at least one fluid-impermeable material;

a fluid communication member extending between the second opening of the primary chamber and the second opening of the secondary chamber, the fluid communication member configured to allow an effluent to transfer from the first cavity of the primary chamber to the second cavity of the secondary chamber;

an outlet member extending outwardly from the third opening of the secondary chamber, the outlet member configured to allow the effluent to transfer out of the second cavity of the secondary chamber when the effluent has reached a predetermined level within the secondary chamber; and a toilet positioned over the top of the primary chamber of the septic system and having an outlet in communication with the first opening of the primary chamber to direct excretory material into the first cavity of the primary chamber.

12. The water closet of claim 11, further comprising an anaerobic bacterial treatment disposed within the first cavity of the primary chamber, the anaerobic bacterial treatment comprising an activated carbon material.

13. The water closet of claim 11, further comprising an agitation member disposed within the first cavity in close proximity to the bottom wall of the primary chamber and supported so as to be movable.

14. The water closet of claim 13, further comprising an enclosure having a door, wherein the agitation member is operated by the movement of the door.

15. The water closet of claim 11, further comprising a chute connected to the toilet and positioned within the first cavity and extending from proximate to the top of the primary chamber and towards the bottom wall of the primary chamber, the chute configured to direct excretory material downwardly from the outlet of the toilet into the first cavity of the primary chamber.

16. The water closet of claim 11, wherein the toilet has a basin and one or more traction members extending outwardly from the basin.

17. The water closet of claim 11, further comprising a floor positioned above the primary chamber and the secondary chamber of the septic system, the floor defining an opening at the top of the primary chamber.

18. The septic system of claim 11, further comprising at least one tubular member spaced a distance apart from the secondary chamber, the tubular member having a plurality of perforations, wherein the outlet member extends away from the secondary chamber and towards the tubular member.

19. The septic system of claim 11, further comprising a third chamber spaced a distance apart from the secondary chamber, the third chamber having a top, a bottom, and at least one side wall, wherein the outlet member extends between the secondary chamber and the third chamber.

20. A water closet kit, comprising:
  a toilet;
  a primary chamber having a top, a bottom wall, and at least one side wall connected to and extending between the top and the bottom wall to at least partially surround a first cavity, the top defining a first opening and the at least one side wall defining a second opening positioned between the top and the bottom wall, the primary chamber constructed of at least one fluid-impermeable material and having a depth and a width, wherein the depth of the primary chamber is within a range from 5 to 20 times the width;
  a secondary chamber having a top, a bottom wall, and at least one side wall connected to and extending between the top and the bottom wall to at least partially surround a second cavity, the top defining a first opening and the at least one side wall defining a second opening, the second opening positioned between the top and the bottom wall, the secondary chamber constructed of at least one fluid-impermeable material;
  a fluid communication member sized to connect to and extend between the second opening of the primary chamber and the second opening of the secondary chamber;
  an outlet member sized to connect to and extend from the third opening of the secondary chamber; and
  a container housing the primary chamber, the secondary chamber, the fluid communication member, and the outlet member.

21. The water closet kit of claim 20, further comprising an anaerobic bacterial treatment additive, the anaerobic bacterial treatment additive comprising an activated carbon material.

22. The water closet kit of claim 20, further comprising an agitation member.

23. The water closet kit of claim 20, further comprising a chute sized to be connected to the toilet and positioned in the first cavity of primary chamber.

24. The water closet kit of claim 20, wherein the toilet has an outlet sized to be in communication with the first opening of the primary chamber.

25. The water closet kit of claim 20, wherein the toilet has a basin and one or more traction members extending outwardly from the basin.

26. The water closet kit of claim 20, wherein the secondary chamber is larger than the primary chamber such that the primary chamber is disposable within the secondary chamber.

* * * * *